(12) United States Patent
Maldonado Saavedra et al.

(10) Patent No.: US 10,670,441 B2
(45) Date of Patent: Jun. 2, 2020

(54) APPARATUS AND METHOD FOR MEASURING A GAS VOLUME FRACTION OF AN AERATED FLUID IN A REACTOR

(71) Applicant: Universidad de Santiago de Chile, Santiago (CL)

(72) Inventors: Miguel Andres Maldonado Saavedra, Santiago (CL); Cesar Patricio Gomez Ocaranza, Santiago (CL)

(73) Assignee: Universidad de Santiago de Chile (CL)

( * ) Notice: Subject to any disclaimer, the term of this patent is extended or adjusted under 35 U.S.C. 154(b) by 415 days.

(21) Appl. No.: 15/287,667

(22) Filed: Oct. 6, 2016

(65) Prior Publication Data

US 2017/0103821 A1   Apr. 13, 2017

(51) Int. Cl.
*G21C 17/00* (2006.01)
*G01F 1/74* (2006.01)
(Continued)

(52) U.S. Cl.
CPC ............. *G01F 1/74* (2013.01); *B03D 1/00* (2013.01); *G01N 29/024* (2013.01); *G01F 1/58* (2013.01);
(Continued)

(58) Field of Classification Search
CPC .... B03D 1/00; G01F 1/58; G01F 1/74; G01N 29/024; G01N 2291/0215; G01N 2291/106
(Continued)

(56) References Cited

U.S. PATENT DOCUMENTS 4,659,218 A   4/1987  de Lasa
7,426,582 B1  9/2008  Rothman
(Continued)

FOREIGN PATENT DOCUMENTS

EP   0620919 B1   1/1993
EP   0674096 A1   3/1994

*Primary Examiner* — Marshall P O'Connor
(74) *Attorney, Agent, or Firm* — Tolpin & Partners PC; Thomas W. Tolpin (57) ABSTRACT

A submersible system and method for measuring the gas volume fraction in an aerated fluid inside a reactor (1) wherein the aerated fluid comprises a gas dispersed in the form of bubbles in a fluid in the form of a solution, suspension, mixture of liquids or a combination thereof. The submersible system comprises: an open and pass-through gas exclusion device (20) of a variable cross section wherein the inlet opening whereby the fluid enters without gas bubbles towards the opened and through gas bubbles exclusion device (20) is greater than the outlet opening whereby the fluid exits without gas bubbles of the opened and through gas bubble exclusion device (20). The outlet opening abuts with an inlet pipe (23). A chamber (24) which can provide a sealed camera, can contain at least one flow meter to measure the gas-free fluid velocity when circulating between an inlet (27) and an outlet (28) of the chamber (24) or sealed camera The inlet (27) of the chamber (24) or sealed camera can be coupled to the inlet pipe (23). The outlet (28) of the chamber (24) or sealed camera can be coupled to an outlet pipe (26) of the liquid dispersion towards the reactor (1). A flow transmitter (29) connected to the flow meter, located inside or outside said chamber (24) or sealed camera, generates an outlet signal proportional to the bubbles-free fluid velocity through a gas bubble exclusion device and a calculation unit (30) which generates an output signal (31) proportional to the gas volume fraction in the aerated fluid.

9 Claims, 6 Drawing Sheets (51) Int. Cl.
*B03D 1/00* (2006.01)
*G01N 29/024* (2006.01)
*G01F 1/58* (2006.01)

(52) U.S. Cl.
CPC ................ *G01N 2291/0215* (2013.01); *G01N 2291/106* (2013.01)

(58) Field of Classification Search
USPC ......................................................... 376/246
See application file for complete search history.

(56) References Cited

U.S. PATENT DOCUMENTS

| | | |
|---|---|---|
| 2004/0210404 A1 | 10/2004 | Gysling |
| 2007/0157737 A1 | 7/2007 | Gysling |
| 2013/0192351 A1 | 8/2013 | Fernald |

APPARATUS AND METHOD FOR MEASURING A GAS VOLUME FRACTION OF AN AERATED FLUID IN A REACTOR

TECHNICAL FIELD

The present invention relates to a submersible apparatus and a method for measuring the gas volume fraction of an aerated fluid. The term "aerated" hereinafter will be used to include the gasification with any gas, wherein the gas is present in the form of bubbles, that is, is not substantially dissolved in the fluid. On its part, the fluid can be a liquid, a mixture of multiple liquids, a solid suspension in liquid or a combination thereof. According to this invention, the reactor can be a tank, a mechanical flotation cell, a flotation column, a fluidization column or the like. An example of an aerated fluid is a multiphase mixture containing finely ground solids suspended in liquid, thereby forming a pulp and gas in the form of bubbles as present in the ore flotation machines. The present invention is particularly useful for the measurement of the gas volume fraction in an aerated ore pulp.

BACKGROUND ART

Multiphase systems, that is, systems that comprise more than one phase, are often used in several industrial processes. In those cases in which gas is used, often this is bubbled throughout a fluid containing one of more disperse phases or wherein said liquid is in a solution. In these systems, the number, velocity and size of gas bubbles play a key role in the process performance. Particularly the total volume fraction taken by the gas or the gas volume fraction is a variable that includes the previously mentioned properties of bubbles and, therefore, its measurement is of critical importance for the characterization of the gas dispersion.

An example of multiphase systems is the ore flotation in which three phases take part: solid, liquid and gas. This process is used in the ore processing industry for the separation of valuable minerals from those without an economic value, while in the energy flotation industry said process is used to separate bitumen drops from sand particles. Among other applications related to the environmental protection are the removal of ink particles from paper fibers in the pulp and paper industry and the wastewater treatment or effluent treatment.

The ore flotation is a separation process, which is based on the differences among the surface properties of particles. The process consists of the gas dispersion, generally air, to form bubbles inside a tank containing a suspension of ore particles in water, thereby forming an ore pulp. This pulp is conditioned with chemical reagents such as collectors, depressants and activators, which purpose is modifying the particle surface properties. Collectors, particularly, function to create or increase the hydrophobicity of the surface exposed to the ore that is aimed to be recovered, that is, preventing the surface from hydrating. This process is assisted by the pH control of the pulp by dosing the pH modifiers such as lime.

Another chemical reagent is the frother (s), which is added to the pulp, they are then, absorbed on the bubbles surface, thereby delaying coalescence among particles, that is, the reduction of the surface area of bubbles due to the formation of particles having a greater volume originating from the smaller ones. In addition, frothers facilitate and stabilize the formation of a froth layer on an upper part of the tank when increasing the water fraction being dragged by the bubbles towards the froth.

The bubbles when freely ascending from the lower part of the tank (flotation machine) through the conditioned pulp, collide with particles forming particle/bubble aggregates in those cases wherein the surface of said particles is hydrophobic, which continue ascending until leaving the collection zone and entering into the froth zone. The hydrodynamic conditions must promote the homogenous distribution of particles and bubbles, and the formation of stable bubble/particle aggregates to minimize the detachment of valuable mineral particles attached to the bubble surface while they are ascending. In this way, the valuable ore-enriched froth overflows by an upper edge of the flotation machine, thereby producing a flow of the product called concentrate. Generally, the hydrophilic particles (gangue) do not attach to the bubbles and they are reported in the other product called tailings. The metallurgical performance of the flotation process and, in turn, financial revenues of the concentrator plant are determined by the valuable ore recovery (quantity) as well as the obtained concentrate ore grade (quality).

Due to the magnitude of the mining operations, which translates into a high treatment capacity, a small improvement in the metallurgical flotation process performance would result in a significant economic benefit, in addition to the environmental benefits regarding the hydric resource management. Considering that the ore grade is rapidly decreasing, it becomes imperative the optimization of the flotation process, to maintain the market competitiveness.

The optimization of the flotation process operation requires, among other initiatives, developing new sensors installed in line, which allow obtaining relevant data regarding the process status for the real-time decision-making. Currently, the in-line sensors in flotation machines are scarce and they are mainly limited to measuring airflows, pulp pH, and froth heights and in some cases, they measure ore grade by using X-ray fluorescence analyzers. Recently, image processing systems have been implemented which by means of the use of digital cameras installed on the flotation machines, monitor the froth surface and determine parameters such as: overflow velocity, color and texture of the froth. In this way, operators only react towards the changes they can observe on the froth surface, from which it is difficult to infer the current process status due to the multivariable and interactive nature of the phenomena that take place in the flotation process. Therefore, a problem faced by circuit flotation operators to find and control more efficient operating conditions to maximize the process metallurgical performance is the lack of instruments for characterizing both the pulp and the gas dispersion in line and in real time.

Studies have shown that variables characterizing the gas dispersion in the form of bubbles, such as the gas surface flow, the gas volume fraction and the bubble size play a key role in the determination of the metallurgical flotation process performance. Particularly, the gas volume fraction in the collection zone has been found to be directly correlated to the bubble surface area flux as described in the document titled "Gas dispersion properties: bubble surface area flux and gas holdup" (2000) by Finch, Xiao, Hardie and Gomez and the document titled "Gas dispersion in column flotation and its effect on recovery and grade" (2012) by Lopez-Saucedo, Uribe-Salas, Pérez-Garibay and Magallanes-Hernández. On its part, the bubble surface area flux is correlated to the particle collection kinetics and, therefore, to the recovery, as described in the article titled "Studies on impeller type, impeller speed and air flow rate in an industrial scale flotation cell. Part 5: Validation of Sb relationship and effect of froth depth" (1998), by Gorain, Napier-Moon, Franzidis and Manlapig which is included as reference. On the other hand, it has been found in laboratory columns working with water and gas, that the gas volume fraction in the gas collection zone partially determines the water flow reported in the concentrate as described in the document titled "A frother-related research at McGill University" (2006) by Finch, Gelinas and Moyo, which is related to the gangue fine particle dragging and therefore to the grade ore reduction. Recently, a study carried out on industrial flotation columns in different zinc concentrator plants has confirmed a direct relationship between the gas volume fraction at the collection zone and the zinc recovery and an inverse relationship with the enrichment ratio, that is, the zinc ore grade in the concentrate divided by the zinc ore grade in the feed, as described in the document titled "Gas dispersion in column flotation and its effect on recovery and grade" (2012), by Lopez-Saucedo, Uribe-Salas, Pérez-Garibay and Magallanes-Hernández.

The previously described studies reveal the important information contained in the gas volume fraction regarding the metallurgical flotation process performance and suggest its use for optimizing the process.

The present invention has as a purpose reducing the lack of instruments in the flotation process by means of the development of a sensor allowing the in-line and real time measurement of the gas volume fraction on an aerated ore pulp inside the flotation machines for the control and optimization of the metallurgical process performance.

BACKGROUND OF THE INVENTION

Several techniques for measuring the gas volume fraction in ore flotation machines have been developed.

Figure 1:
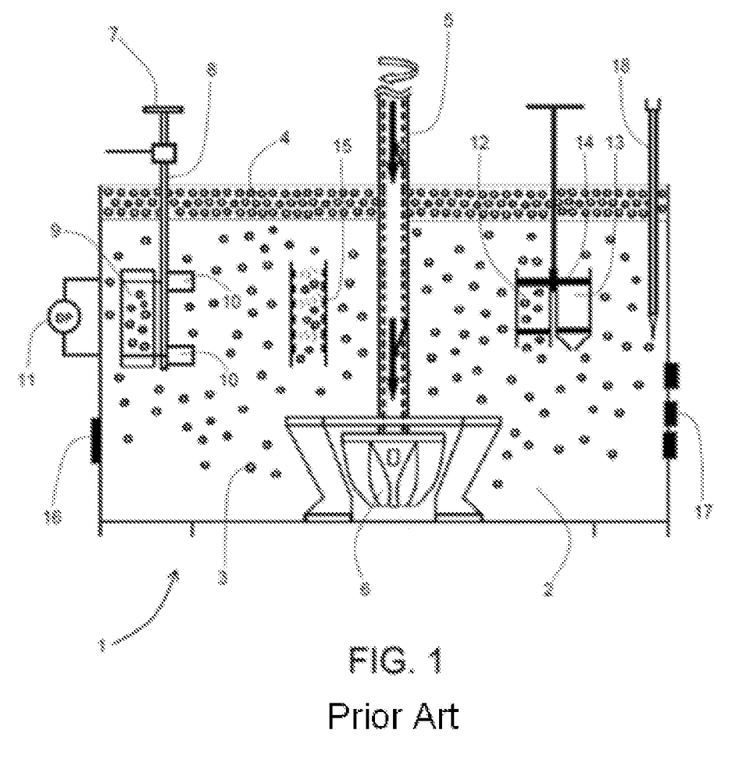
FIG. 1 shows a schematic view of an ore flotation machine wherein measurements techniques of the gas volume fraction which are described in the state of the art, are shown.

As shown in FIG. 1, a flotation machine exemplified by means of a mechanical cell (1) contains ore pulp (2) formed by a suspension of ore particles and water. Flotation mechanical cells (1) have a hollowed-out axis (5) on its center, rotated by means of two conventional motors located outside said cells. The hollowed-out axis (5) is connected to a rotor (6) which agitates the ore pulp (2) and introduces gas coming from the central duct of said hollowed-out axis (5) with which multiple gas bubbles are generated (3). To the extent that gas bubbles (3) are ascending towards the surface, the mineral particles with a hydrophobic surface, contained in the pulp (2), get attached to the surface of the gas bubble (3) and they go up to the froth zone (4) enriched with mineral particles.

In the same FIG. 1, the implementation of the main techniques used for the measurement of the gas volume fraction in flotation machines are shown. These techniques can be classified according to the performance measurements to infer the gas volume fraction in:
1. capturing
2. hydrostatic pressure signal measurements
3. optical signal measurements
4. Electrical conductivity signal measurements
5. computed tomography measurements
6. acoustic signal measurements The technique based on the sampling or "capturing" is the simpler one and consists of the obtaining of a sample (of a known volume) of the aerated pulp so as to determine what percentage of said volume is taken by gas as described in the document titled "Studies on impeller type, impeller speed and air flow rate in an industrial scale flotation cell. Part 2: effect on gas holdup" (1995) by Gorain, Franzidis and Manlapig and in the document titled "Characterization measurements in industrial flotation cells" (2010) by Harbort and Schwarz.

The sample collector (7) is comprised by a spear (8) which at one of its ends has a cylindrical tube (9) provided with valves (10). In this way, the volume to be sampled is defined by the cylindrical tube diameter (9) and the valves distance (10) which normally is determined by measuring trapped filling water volume. The sample collector (7) is submerged in the aerated pulp zone or in the collection zone, under the froth zone (4) with its valves opened which allows the pulp and bubbles to freely pass through it. Then, valves (10) close at the same time by means of a pneumatic or mechanical system and the sample collector (7) is removed from the flotation machine (1) with the gas-pulp sample trapped (caught). Once the sample collector is outside the flotation machine (1) valves (10) are opened and the caught pulp volume is measured. The difference between the total volume of the sample and the volume taken up by the pulp corresponds to the gas volume. In this way, the gas volume fraction is calculated as the trapped (holdup) gas volume divided by the total volume of the sample. The main advantage of this method is its simplicity. Among the disadvantages thereof is the fact that it does not generate an output signal proportional to the measurement, therefore, it is not possible to visualized tends which allow verifying whether the measurement is performed under permanent regime conditions or under a transient regime conditions. Due to this same aforementioned fact, this system is only used with diagnosis purposes and it cannot to be applied in real-time control and optimization systems.

The gas volume fraction in the collection zone of a flotation machine (2) can be also inferred from the measurement of the pressure difference between two points located at different depths by means of a differential pressure sensor (11). The equation that relates the pressure difference (ΔP) between two points separated by a vertical distance L as disclosed in chapter 1 of the book titled "Column Flotation" (1990) by Finch and Dobby.

$$\varepsilon_g = 1 - \frac{\Delta P}{\rho_p \cdot g \cdot L} \qquad (1)$$

wherein $\varepsilon_g$ is the gas volume fraction, g is the gravitational acceleration and $\rho_p$ is the pulp density, which requires to be calculated o measured by means of an additional sensor. Its main disadvantage lies on the fact that the pulp density value must be supposed or measured, which tends to lead to errors regarding the measurement accuracy, since normally the pulp density is not constant but varies along with the operating conditions. The on-line pulp density measurement by means of the use, for example, a nuclear densimeter is expensive and requires a special handling.

Other proposed methods consists of the variation detection of a physical property nearby a detector (18) submerged on the aerated pulp. These techniques are based on the frequency and contact time between bubbles and the gas submerged sensor (18). This category includes two methods: the first one determines the gas volume fraction according to the variations in the optical properties nearby the optical fiber transmitters as described in the document titled "Local gas holdup measurements in fluidized bed and slurry bubble column" (2001), by Schweitzer, Bayle and Gauthier and the second one is based on electrical conductivity variations as described in the document titled "Comparison of gas holdup distribution measurements in a flotation cell using capturing and conductivity techniques" (2006), by Sanwani, Zhu, Franzidis, Manlapig and Wu. The first method is based on the variations measurement with respect to the time of the reflected light intensity when one or several emitted light beams enter into contact with different means such as water, solids or gas. These signals are then transformed into a voltage signal which is proportional to the percentage of reflected light. The gas volume fraction is then calculated as the time this probe is in contact with the gas wherein said time is determined by the voltage signal threshold divided by the total measurement time. The method that is based on the electrical conductivity variation when bubbles are nearby a submerged probe has the same functioning mode. This sensor was developed by CSIRO Thermal and Fluid Engineering Laboratory in Australia and consists of a probe which at its submerged end has a pair of electrodes connected to an oscillator (AC). When the bubbles are in contact with the electrodes, the voltage generated between them is higher than when only liquid is present due to bubbles behaving as dielectric materials. In the same way as in the case of sensors using optical fiber, a great number of conductivity (voltage) measurements are carried out and then the gas volume fraction is calculated as the time during which voltage is over a threshold (contact time between electrodes and gas bubbles) divided by the total measurement time. The main advantage of these methods is that they allow a continuous measurement. However, they require calibration (determining the voltage threshold proportional to the reflected light o to the change/variation in the electrical conductivity, which makes a difference between bubbles and solid and/or liquid). In addition, they require corrections which allow compensating for the fact that small bubbles have a smaller probability of being detected. In turn, the sensor based on the conductivity measurement has only been evaluated in an air-water system so far and its extension to solids does not look promising due to mineral particles behaving as bubbles in the sense of being opposed to the passing of an electric current.

At McGill University in Canada, a method based on the application of Maxwell's equation has been developed which relates the conductivity of a continuous electrically conductive phase containing a dispersed non-conductive phase to the volumetric fraction taken up by the non-conductive phase as disclosed in the Engineering Master Thesis of McGill University in Canada titled "Design of a Gas holdup sensor for flotation diagnosis" (1998), by Franklin Cortés-López and en el article titled "Industrial testing of a gas holdup sensor for flotation systems" (2003), by Gomez, Cortés-López and Finch.

As illustrated in FIG. 1, this method consists of two tubes having both ends (12) and (13) opened which are provided with electrodes in the form of rings (14) attached to the inner walls of said tubes and which allow measuring the electrical conductivity of the material contained in said tubes. In order to determine the electrical conductivity in the gas pulp an opened tube (12) and a tube having an opening at the lower end (13), the latter producing a siphoning effect which prevents bubbles from entering and which allows measuring electrical conductivity of the gas-free pulp are used. The gas volume fraction is calculated by means of the application of the Maxwell's equation which results in the following equation:

$$\varepsilon_g = \frac{k_p - k_d}{k_p + 0,5 \cdot k_d} \quad (2)$$

wherein $k_d$ is the electrical conductivity of the aerated pulp in the opened tube (12) and $k_p$ is the electrical conductivity of the pulp measured in the tube having an opening at its lower end (13). The advantage of this measurement is that this in continuous and performed in real time which allows its use in control and optimization systems. Among the main disadvantages is the fact that electric components such as the metallic electrodes (14) are in direct contact with the ore pulp (2) and, therefore, are exposed to solids being deposited over said electrodes (14) by means of a mechanical and/or electrochemical effect, which reduces the measurement accuracy. In addition, an error in the equation (2) has been recently detected which is originated when assuming that the pulp behaves as continuous conductive medium which reduces its accuracy. The correct application of the Maxwell's equation with respect to a three-phase system would consider not only the aerated and non-aerated pulp conductivity but also the pure liquid conductivity (water).

Other methods that have been proposed for determining the gas volume fraction in multiphase systems consist of the use of tomography techniques such as gamma-ray tomography as described in the document titled "Gamma ray tomography—An experimental analysis of fractional gas hold-up in bubble columns" (2008) by Patel and Thorat and the electrical resistance tomography as described in the document titled "Electrical resistance tomography coupled with differential pressure measurements to determine phase hold-ups in gas-liquid-solid outer loop bubble column" (2010) by Jin, Han, Yang and Helos. In the case of the system based on the gamma-ray tomography, it consists of a gamma-ray emitter (16) and one or more receivers (17) wherein the attenuation between the emission and reception is correlated with the material composition between emitter and receiver. These techniques are very expensive and require a special handling, and therefore its application has been mainly limited to laboratory scale.

In the same way, in the patent document literature, several attempts for measuring the gas volume fraction with an aerated fluid are described.

For example, document US 2004/210404 dated Oct. 21, 2004 titled "Apparatus and method of measuring gas volume fraction of a fluid flowing within a pipe" discloses an apparatus that measures the speed of sound or acoustic disturbances propagating in a fluid or mixture having entrained gas/air to determine the gas volume fraction of the flow propagating through a pipe. The apparatus includes an array of pressure sensors disposed axially along the length of the pipe in addition to the measurement or estimation of the pressure and/or temperature of the aerated flow determining variations on the gas compressibility. The apparatus measures the speed of sound propagating through the fluid to determine the gas volume fraction of the mixture using adaptive array processing techniques to determine the gradient of acoustic variations in the plane, wave number versus angular frequency (k-ω).

U.S. Pat. No. 7,426,852 dated Sep. 23, 2009 titled "Submersible meter for measuring a parameter of gas hold-up of a fluid" discloses a submersible meter which is provided with measurement means to measure the speed of sound propagating in an aerated fluid to determine any one of a plurality of parameters of the fluid, such as the gas holdup of the fluid, the bubble size, the bubble surface area flux, and the kinetics flotation rate constant. The meter includes a spatial array of sensors disposed at predetermined axial locations axially along a tube. The array of sensors provides acoustic pressure signals to a transmitter, which determines the speed of sound propagating through the aerated fluid in the tube using signal-processing techniques. The submersible sensor enables real time measurement of gas volume fraction, bubble size, the bubble surface area flux and kinetics flotation rate constant, which enables real time monitoring and control of the flotation process efficiency.

Document US 2007/157737 dated Jul. 12, 2007 titled "Apparatus and method for measuring a parameter of a multiphase flow" discloses an apparatus that determines a characteristic of a multiphase fluid, such as an aerated oil and water fluid, flowing within a pipe. The apparatus includes a fluid flow meter; a water cut meter, and a density meter, wherein the density meter determines the density of the fluid flow to determine the gas volume (or void) fraction of the multiphase fluid flow. The output signal of each of the meters is provided to a multiphase flow model to provide a plurality of multiphase parameters, such as phase fraction, volumetric flow, and mass flow of each of the phases of the multiphase mixture, optimized for various flow conditions.

Document US 2013/0192351 dated Aug. 1, 2013 titled "Method and apparatus for determining GVF (gas volume fraction) for aerated fluids and liquids in flotation tanks, columns, drums, tubes, vats" discloses a signal processor that receives a signal containing information about an acoustic signal that is generated by at least one acoustic transmitter, that travels through an aerated fluid in a container, and that is received by at least one acoustic receiver arranged in relation to the container, including inside the container; and determines the gas volume fraction of the aerated fluid based at least partly on the speed of sound measurement of the acoustic signal that travels through the aerated fluid in the container. The processor also sends an output signal containing information about the gas volume fraction of the aerated fluid. The signals processor may be configured together with at least one acoustic transmitter, and at least one acoustic receiver.

U.S. Pat. No. 4,659,218 dated Apr. 12, 1987 titled "Multi-probe system for measuring bubble characteristics gas hold-up, liquid hold-up and solid hold-up in a three-phase fluidized bed" discloses a method and apparatus for determining one or more physical characteristics of individual bubbles in multiphase systems at high temperatures and pressures. Multiple optical fiber probes are inserted in the system wherein gas bubbles ascend. A source of incident light is directed onto each of the probes and several sensors measure the change in light intensity of reflected light which is evaluated over time to determine the solid-liquid-gas hold-ups in a three-phase system.

Document EP 0674096 dated Mar. 21, 1994 titled Gas holdup for cased well boreholes" discloses a device for measuring the gas hold up fraction of a fluid which comprises a low energy gamma ray source to irradiate the flowing fluid, and a detector to detect the gamma rays dispersion. The gas volume fraction is determined by means of a detected ray processing.

Document EP 0620919 dated Jan. 6, 1993 titled "Method for determining gas holdup" discloses a method for determining gas hold-up in a fermentation process, which consists in the voltage application to a pair of electrodes in contact with the fluid prior to aeration and during fermentation, and determining the magnitude of the electrical current produce in each case. The method uses the difference in the magnitude of the electrical current produced by applying a voltage prior to aeration and during fermentation as a measure of the gas hold-up.

In summary, the previously proposed techniques do not offer the necessary characteristics to measure the gas volume fraction in flotation machines with the solidity, reproducibility and accuracy necessary to implement an on-line monitoring and control system. On the contrary, the proposed invention offer the characteristics, which will promote its use in the development of a permanent monitoring and control system.

1. It allows an on-line and real time measurement of the gas volume fraction.
2. The gas volume fraction measurement is not affected by the presence of other disperse phases such as solid particles or liquid drops.
3. The accuracy only depends on the measurement of a variable, the pulp velocity circulating through a tube using a non-invasive technique (for example, a magnetic flow meter).

Measured velocities with this kind of instrument present an error rate lower than 0.5%.

4. The measurement is precise since the error propagation when calculating the volumetric fraction is minimum when based only on one measurement.
5. Once installed in the process, the device does not require to be re-calibrated.
6. It provides a wide measurement range of the gas volume fraction in pulps, which includes the range observed in the flotation process (5% up to 30% approximately).
7. The measurement provides an average of the gas content (hold-up) in the whole volume of the flotation machine comprised between the depths defined by the upper and lower ends of the device and is not limited to the radial position in which the device is installed.

A comparative analysis between the advantages and disadvantages of the different proposed measurement techniques are shown in the following table:

| Characteristic/ Technique | Capturing | Pressures | Conductivity (McGill University) | Conductivity (CSIRO) or optical fiber | Sound propagation | Tomography | present invention |
|---|---|---|---|---|---|---|---|
| Response Time | ✗ | ✓ | ✓ | ✓ | ✓ | ✓ | ✓ |
| Measurement | ✓ | ✓ | ✓ | ✓ | ✗✓ | ✓ | ✓ |
| Sensibility | ✓ | ✓ | ✓ | ✓ | ✗✓ | ✓ | ✓ |
| Linearity | ✓ | ✓ | ✓ | ✓ | ✗✓ | ✓✗ | ✓ |
| Accuracy | ✓✗ | ✗ | ✓✗ | ✗ | ✓ | ✓ | ✓ |
| Solidity when facing Error propagation | ✓ | ✗ | ✗ | ✗ | ✓ | ✓ | ✓ |
| Portability | ✓ | ✓ | ✓ | ✓ | ✓ | ✗ | ✓ |
| Simplicity | ✓ | ✓ | ✓ | ✓ | ✗ | ✗ | ✓ |
| Cost | ✓ | ✓ | ✓ | ✓ | ✓✗ | ✗ | ✓ |

SUMMARY OF THE INVENTION

According to one aspect of the invention, a submersible sensor is provided for measuring the gas volume fraction of an aerated fluid wherein the gas in the form of bubbles is dispersed in a liquid, liquids mixture, solids suspension in liquid or a combination thereof. The apparatus comprises a tube, vertically submerged in an aerated fluid, said pass-through tube being opened at their ends having a reduction in its cross area, since the upper end has an opening which cross section is greater than the cross section of the opening of the lower end for generating a descending continuous fluid flow without bubbled passing through it. Said open and pass-through-tube is called a gas exclusion device. At the lower section of said gas exclusion device, the apparatus includes a flow meter (sensor) which allows inferring the velocity of the flow. A Processing unit provides an output signal indicating the gas volume fraction in response to the measurement of the fluid velocity.

According to another aspect of the invention, a method for measuring the gas volume fraction in the form of bubbles dispersed in a fluid, comprising the measurement of the velocity with which said fluid flows without gas bubbles inside a gas exclusion device and the determination of the gas volume fraction in the aerated fluid in response to the velocity of the fluid without gas bubbles, is provided.

Among the preferred applications of the present invention, the submersible system is submerged at the collection zone of an ore flotation machine, for measuring the gas volume fraction dispersed in the form of bubbles in a homogenous suspension of solids in water, thereby forming the ore pulp.

The components, characteristics and advantages of the present invention will be evident from the following descriptions of the examples of the embodiments.

BRIEF DESCRIPTION OF FIGURES

The accompanying figures are included to provide a better understanding of the invention; they are part of this specification and also illustrate one of the preferred embodiments of this invention.

DESCRIPTION OF THE INVENTION

Figure 2:
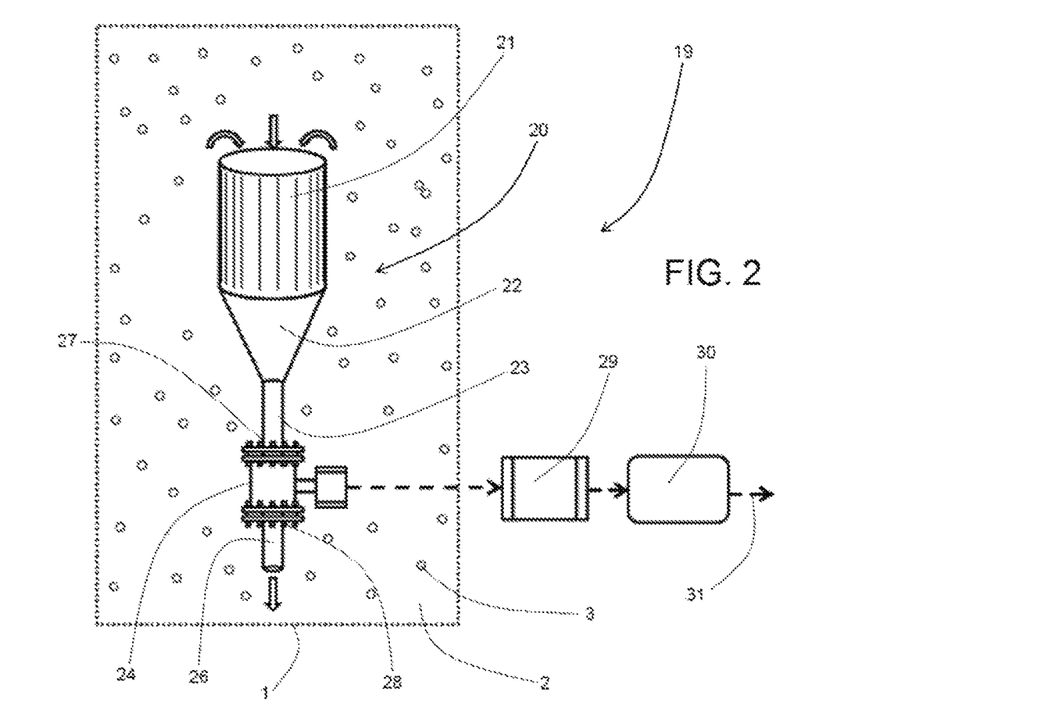
FIG. 2 shows a schematic view of a submersible system for measuring the gas volume fraction dispersed in the form of bubbles in an aerated flow according to the present invention.

As illustrated in FIG. 2, a submersible sensor (19) providing a submersible system, is provided for measuring the gas volume fraction of an aerated flow in a reactor. The fluid (2) can be a liquid, a mixture of multiple liquids, a solid suspension in liquid or a combination thereof. An example of an aerated fluid is a multiphase mixture containing a finely ground solid suspension in water, thereby forming a ore pulp and gas in the form of bubbles as presently found in an ore flotation machines. To simplify the explanation of the present invention, the submersible sensor (19) will be described as a sensor for measuring the gas volume fraction in an aerated ore pulp, understanding that the submersible sensor can be used for measuring the gas volume fraction in any other aerated fluid when the gas is present in the form of bubbles. As will be now described in more detail, the submersible sensor measures the output speed of the pulp when flowing through a gas exclusion device for determining the gas volume fraction in the region where the apparatus is submerged.

Figure 3:
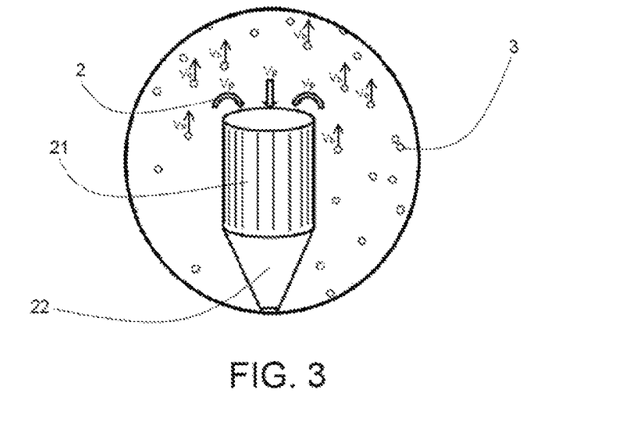
FIG. 3 shows an exploded schematic view of a cylindrical tube of the gas exclusion device, according to the present invention.

The submersible system (19) comprises an open and pass-through gas exclusion device (20) which comprises a tube which ends are opened, vertically installed in an aerated fluid, which cross section presents a reduction from its upper end towards its lower end. The reduction at the opening of the lower end of the gas exclusion device (20) prevents the bubbles (3) from freely entering inside said device, which produces a difference with respect to the apparent density of the aerated pulp outside of the gas exclusion device and that of the gas-free pulp inside the gas exclusion device (20), which generates a continuous descending flow of the pulp through the gas exclusion device exiting by the opening of the lower end, thus returning to the flotation machine (1), and which enters by the upper end of the gas exclusion device (20). This output flow from the gas exclusion device (20) by its lower end completes the bubbles exclusion. The upper section opening of the gas exclusion device (20) must be such that the fluid velocity at the entry of the gas exclusion device (Vp) must be lower than the velocity of the ascending bubbles (Vb) as illustrated in FIG. 3 to prevent these bubbles from being dragged towards the interior of the gas exclusion device (20). At the lower section of the gas exclusion device (20) a flow meter-containing chamber (24), can provide a sealed camera, containing a flow meter which measures, through a flow transmitter (29) the velocity of the pulp circulating by the sensor, is included. The flow meter—containing chamber or sealed camera can comprise a flow measurement means containing at least the flow meter which allows measuring the velocity of the gas-free fluid.

A processing unit (30) determines the gas volume fraction in response to a signal generated by the transmitter (29) which is proportional to the velocity of the pulp.

In an embodiment of the submersible system (19) the flow meter inside the flow meter-containing chamber or sealed camera and its corresponding transmitter (29) measure the pulp flow velocity descending in the lower section of a gas exclusion device (20) by means of a volumetric flow sensor, for instance, a magnetic flow meter which determines the velocity of a flow through the application of a magnetic field, which field lines are perpendicular to the flow direction and which generate an induced voltage which is measured through a pair of electrodes installed at opposite ends of the tube, thereby forming an imaginary orthogonal line both in the magnetic field direction and the flow direction and which is proportional to the velocity of the fluid according to the Faraday Law of Electromagnetic induction. The processing unit determines the gas volume fraction dispersed in the form of bubbles in the aerated pulp in response to the measurement of the descending flow velocity of the pulp.

The open and pass-through gas exclusion device (20) can be formed by one or more different cross-sectional areas. In an preferred manner, the open and pass-through gas exclusion device (20) is formed by a cylindrical and straight tube (21) of a constant diameter, which is opened and through at its ends, which abuts with a diameter reducing section (22) also opened and through at its ends as for example, an inverted cone, wherein its greatest diameter is equal to the diameter of the cylindrical tube (21) which reduces up to a smaller diameter wherein it abuts with an inlet pipe (23).

In a preferred manner, the open and pass-through exclusion device (20) could be formed only by one diameter reducing section (22) which can also be an inverted cone.

The inlet pipe (23) is connected to the inlet (27) of a sealed camera (24) wherein a flow meter is located, which allows measuring the velocity of the pulp circulating through said inlet (27) and the outlet (28) of the sealed camera (24). The outlet (28) of the sealed camera (24) abuts with an outlet pipe (26) with which the ore pulp (2) returns to the flotation machine.

The flow meter provides a sensor contained in the flow meter-containing chamber (24) or sealed camera and is adapted to be submerged and installed in the lower section of the open and pass-through exclusion device (20). The flow transmitter (29) which can be installed inside the flotation cell (1), or, in a remote way, for example, outside the flotation cell (1), generates an output signal proportional to the velocity of the pulp flowing through the flow meter located inside the sealed camera (24) which is processed by a processing unit (30) that generates an output signal (31) proportional to the gas volume fraction of the aerated fluid in the region wherein the submersible system (19) is submerged. The flow transmitter (29) is connected to the flow meter which can be located inside or outside said flow meter-containing chamber (24) or sealed camera.

The open and pass-through gas exclusion device (20), in order to resist adverse working conditions during an extended period of time, preferably is manufactured from a material resistant to corrosion and abrasion, for example, a plastic or ceramic material (PTFE, PVDF or derivatives thereof). At the lower section of the open and pass-through gas exclusion device (20) is installed the flow meter providing a sensor inside the flow meter-containing chamber (24) or sealed camera which can be installed by means of flanges fixed by means of bolts and nuts, screwed or in a similar way. The flow meter providing a sensor protected inside the flow meter-containing chamber or sealed camera is electrically connected to the flow transmitter (29) which generates an output signal proportional to the velocity of the pulp passing through a sensor located inside the flow meter-containing chamber (24) or sealed camera.

The flow meter providing the sensor or sensor element contained inside the sealed camera (24) is adapted to be submerged in a suspension, for example, by means of the encapsulation of the electronic components of the sensor in a mechanical way or by means of chemical additive providing it with IP 68 properties.

The flow transmitter (29) is preferably installed outside the aerated flow, for example, outside the flotation machine and is electrically connected to the flow meter providing the sensor inside the flow meter-containing chamber (24) or sealed camera by means of a cable, which is canalized through a conduct that protects it from external conditions.

The processing unit (30) receives an output signal proportional to the velocity of the pulp passing by the flow meter providing the sensor located inside the flow meter-continuing chamber (24) or sealed camera (24) and calculates the gas volume fraction dispersed in the form of bubbles (3) in the ore pulp (2). The processing unit (30) can be implemented in any electronic device with processing capacity such as a computer, a PLC (Programmable Logic Controller), a DCS (Distributed Control System), a microprocessor or the like.

According to the present invention, the flow meter inside the flow meter-containing chamber (24) or sealed camera measures the velocity of the pulp to determine the gas volume fraction by means of the following equation (3), which is obtained when applying the energy-conservation principle to the fluid passing through a flow meter inside the sealed camera (24) installed at the lower section of a gas exclusion device (20).

$$\varepsilon_g = \frac{1}{2gL} \cdot \left(\frac{v}{C_d}\right)^2 \cdot \left[1 - \left(\frac{d}{D}\right)^4\right] \quad (3)$$

wherein
$\varepsilon_g$: Gas volume fraction in the aerated fluid
L: Total length of the apparatus according to the present invention
v: Fluid velocity through the gas exclusion device measured at the lower section thereof
$C_d$: Discharge coefficient
d: Lower end diameter of the gas exclusion device
D: Upper end diameter of the gas exclusion device (D>d)
g: Acceleration of gravity The discharge coefficient ($C_d$) represents the quotient between the flow real velocity measured by the flow meter located inside the sealed camera (24) and the theoretical velocity that would result if the flow did not experiment any energy loss when flowing through the apparatus proposed in this invention as defined in the book titled "Applied Fluid Mechanics" (2006) by Mott for a fluid flowing through a Venturi tube. According to the present invention, the discharge coefficient can be expressed as:

$$C_d = \sqrt{\frac{1 - \left(\frac{d}{D}\right)^4}{1 - \left(\frac{d}{D}\right)^4 + K}} \quad (4)$$

wherein D and d are the diameters of outlet and inlet openings of the gas bubble exclusion device (20) respectively and K is the total resistance coefficient regarding the passing of the fluid. Parameter K is a function of the geometry of the gas exclusion device, the type of the flow meter, the surface roughness whereby the fluid flows and Reynolds (Re) Number of the fluid. Once the geometry and the material of gas exclusion device as well as the type of flow meter are completely determined, the total resistant coefficient (K) is mainly a function of the velocity of the pulp in the lower section of the gas exclusion device, that is, K=ƒ(v). A preferred mathematical function, but not the only one, to relate the fluid velocity of the lower end of the gas exclusion device and the resistance coefficient is:

$$K = a \cdot v^{-b} \pm c \quad (5)$$

wherein a, b and c are real values to be experimentally determined or this can be done means of a flow dynamic simulation.

In this way, the discharge coefficient is a function of the velocity of the pulp (v) exiting through the lower section of the gas exclusion device (20) and the outlet and inlet diameter ratio (d/D) thereof.

$$C_d(v) = \sqrt{\frac{1 - \left(\frac{d}{D}\right)^4}{1 - \left(\frac{d}{D}\right)^4 + (a \cdot v^{-b} + c)}} \quad (6)$$

Figure 8:
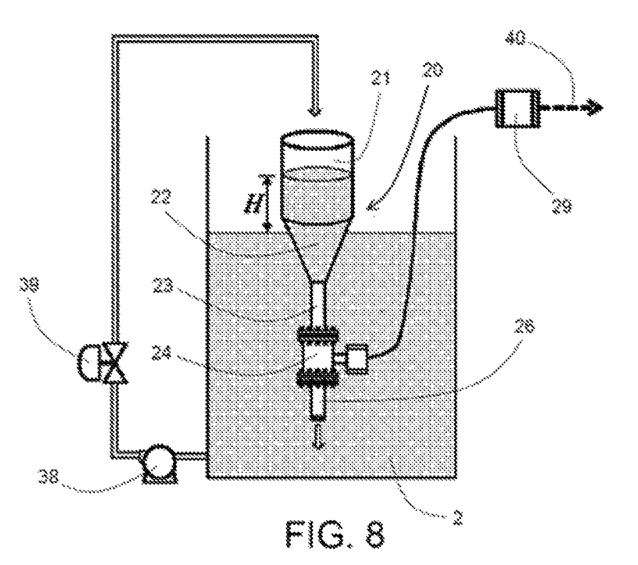
FIG. 8 shows a schematic view of a submersible sensor which is partially introduced in a tank containing a determined fluid which can be water, ore pulp or other fluid representing the characteristics of the fluid to be used in the final industrial application for determining the discharge coefficient model.

For the experimental determination of the parameters a, b and c in the discharge coefficient model preferably an adaption of the set-up proposed in the Engineering Master Thesis at the McGill University in Canada, titled "Design of a gas holdup sensor for flotation diagnosis" (1998), by Franklin Cortés-López, is used. FIG. 8 illustrates an application of said set-up in the determination of the discharge coefficient model according to the present invention.

In the set-up, the submersible sensor is partially introduced in a tank containing a determined fluid, this can be water, ore pulp or other fluid representing approximately the characteristics of the fluid to be used in the final application. By means of a pump and a valve (39) a recirculation fluid flow is regulated from the tank towards the upper opening of the gas exclusion device (20) which produces, in a stationary status, a difference between the fluid level inside the submersible sensor and the fluid level in the tank (H) as illustrated in FIG. 8. The real velocity (40) of the fluid is provided by means of the flow meter inside the flow meter-containing chamber (24) or sealed camera and its corresponding transmitter (29). The theoretical or ideal velocity, that is, under the assumption that there are no energy losses, can be calculated when applying the Bernoulli equation to the fluid through the sensor proposed according to the present invention.

$$v_{ideal} = \sqrt{\frac{2 \cdot g \cdot H}{1 - \left(\frac{d}{D}\right)^4}} \quad (7)$$

Figure 9:
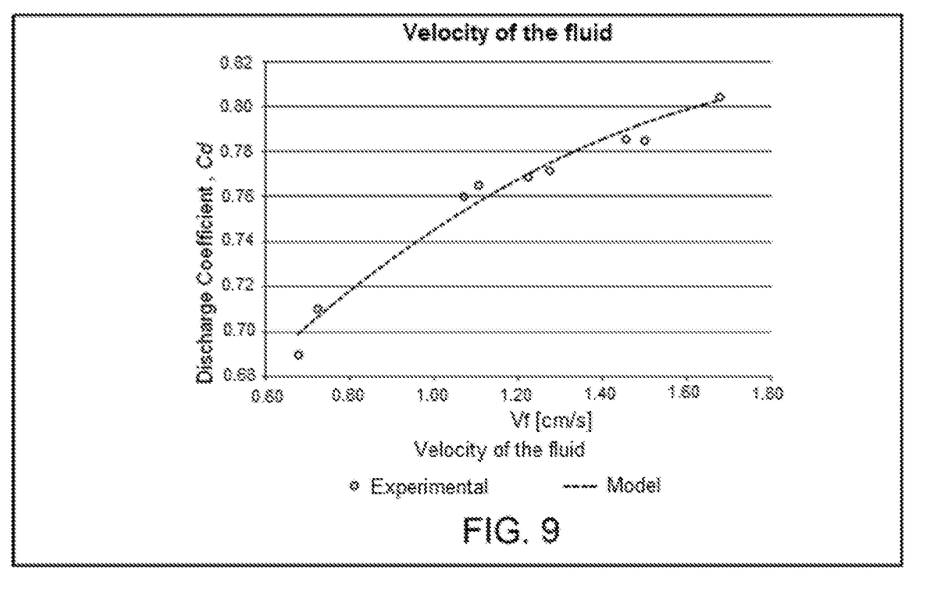
FIG. 9 shows a chart with the experimental data showing the relationship between the discharge coefficient and the fluid velocity of the fluid, in this case, water.

In this way, the discharge coefficient can be calculated as the quotient between the velocity of the flow determined by means of the flow meter inside of the flow meter-containing chamber (24) or sealed camera and its corresponding transmitter (29) and the theoretical velocity calculated by means of the equation (7). This procedure is repeated by modifying the recirculation flow and storing the flow velocity data and the corresponding height difference H, thus generated. FIG. 9 shows the typical relationship between the discharge coefficient and the velocity of the fluid. Parameters a,b and c which are determined by means of the minimization of the sum of the squared differences between the experimentally determined discharge coefficient and the value provided by the model shown in FIG. 9 turned out to be for this particular case a=0.794, b=0.715 and c=0.

Figure 10:
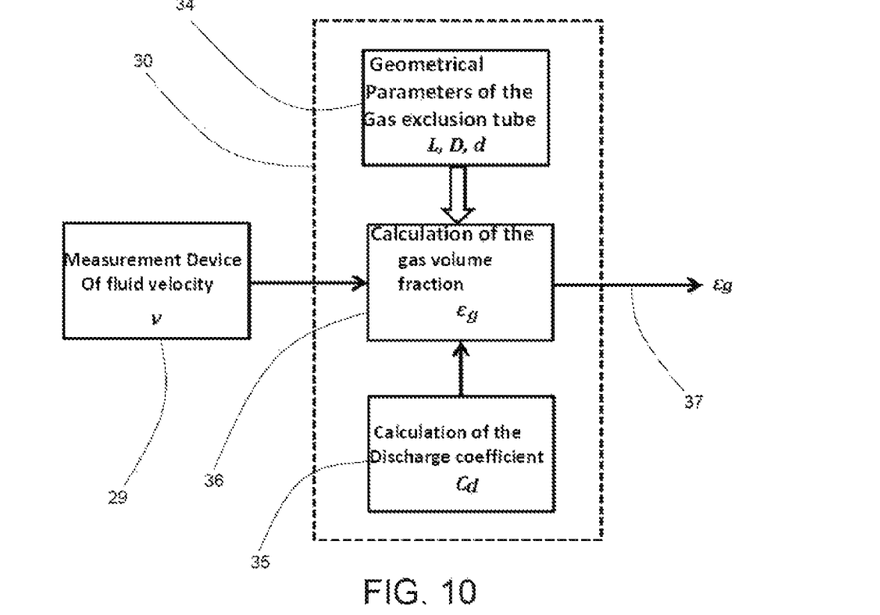
FIG. 10 shows a block diagram of the submersible system for measuring the gas volume fraction according to the present invention.
Figure 11:
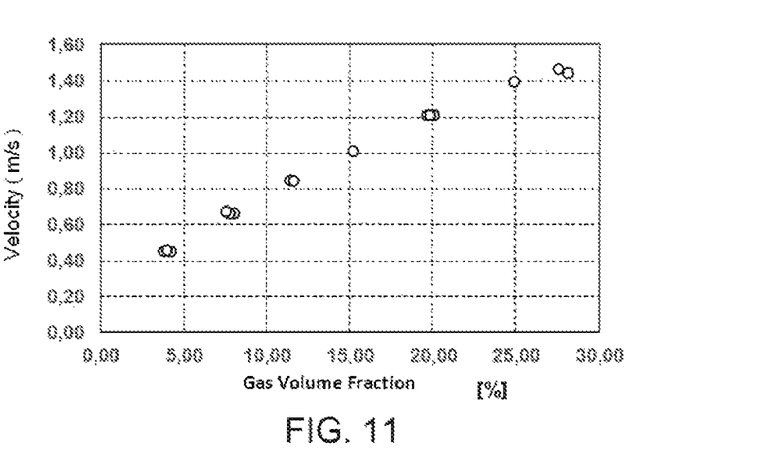
FIG. 11 shows a chart with experimental data wherein it is possible to observe the direct relationship between the gas volume fraction and the velocity of a fluid.

In order to facilitate the process of measuring the fluid velocity without gas bubbles, for instance, the ore pulp (2) and determining the gas volume fraction dispersed in the form of bubbles (3), in such a way that said volumetric fraction can be used for monitoring and controlling the process inside a flotation machine, the system is provided with a processing unit (30) which block diagram is shown in FIG. 10. The processing unit (30) receives the information of the fluid velocity from the transmitter (29) and provides as an output signal (37) the gas volume fraction value, $\varepsilon_g$. Said processing unity (30) has stored the geometrical parameters of the gas exclusion device in a memory (34) and it is also provided with a processor (35) which calculates the discharge coefficient $C_d$ considering the velocity of the flow provided by the transmitter (29), the diameter reducing ratio (d/D) and parameters experimentally determined or by means of a computer simulation. The flow velocity value provided to the processing unit (30) by the transmitter (29), the geometrical parameter values of the gas exclusion device stored in the memory (34) and the discharge coefficient $C_d$ provided by the first processor (35) go in confluence up to a second processor (36) which calculates the gas volume fraction $\varepsilon_g$, and provides it as an output signal (37) for monitoring the process, or, to perform corrections as for example, injecting a greater quantity of air, or incorporating more chemical reagents such as frothers with which is possible to implement an automatic control system for flotation machines.

Example of the design calculation with the design conditions of the exclusion device.

Conditions of the Design

1) The measurement range of the gas volume fraction in a flotation machine normally varies between 5% and 30%.

2) The minimum diameter at the lower end of the gas exclusion device must be of at least 1 inch (25 mm) in order to prevent the sensor of the design from clogging in case of existing elements alien to the process.

Figure 4:
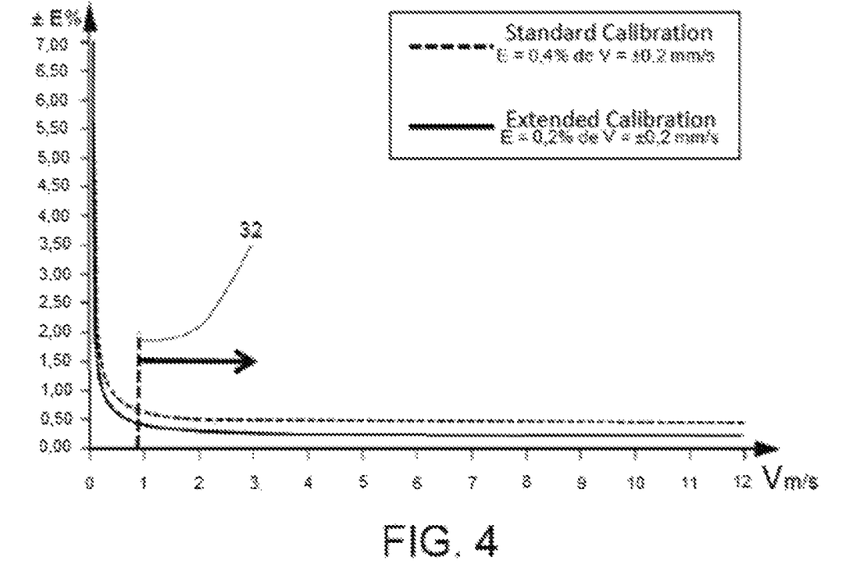
FIG. 4 shows a chart regarding the typical relationship between the measurement error of a magnetic flow meter and the magnitude of the measured flow velocity.

3) The minimum velocity of the fluid at the lower end of the gas exclusion device must be greater than 0.7 m/s (which is a value that guarantees a good accuracy on the part of the flow meter according to what is shown in reference (32) of FIG. 4).

Figure 5:
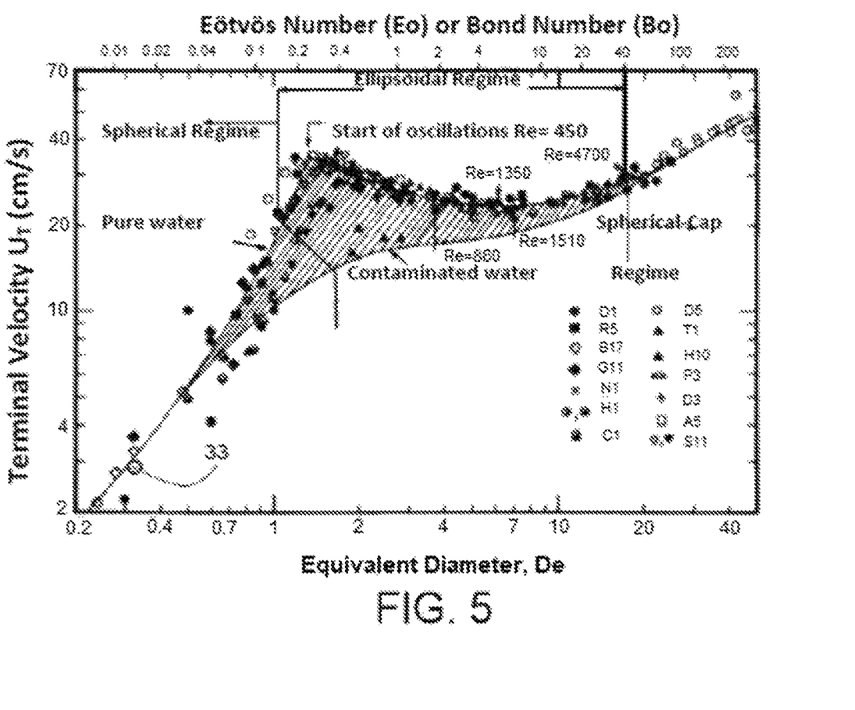
FIG. 5 shows a chart regarding the relationship between the ascending velocity of air bubbles and its equivalent diameter.

4) The maximum velocity at the upper end of the gas exclusion device must be lower than 3 cm/s, which guarantees that bubbles of a diameter greater to approximately 0.3 mm, will not be dragged towards the interior of the gas exclusion device as a result of the circulating flow, as shown in reference (33) in the FIG. 5.

Figure 6:
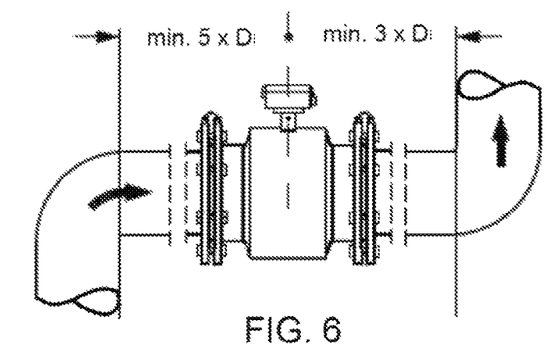
FIG. 6 shows a tube having minimum distance limitations between the flow sensor and the elements causing the energy loss.

5) The minimum closest distance between the flow meter inlet and the restriction regarding the flow passing upstream must be at least 5 times the diameter of the nominal pipe of the flow meter element in order to guarantee that the fluid is completely developed at the measurement point as shown in FIG. 6.

6) The minimum closest distance between the flow meter outlet and the restriction regarding the flow passing downstream must be at least 3 times the diameter of the nominal pipe of the flow meter element in order to guarantee that the fluid is completely developed at the measurement point as shown in FIG. 6.

Figure 7:
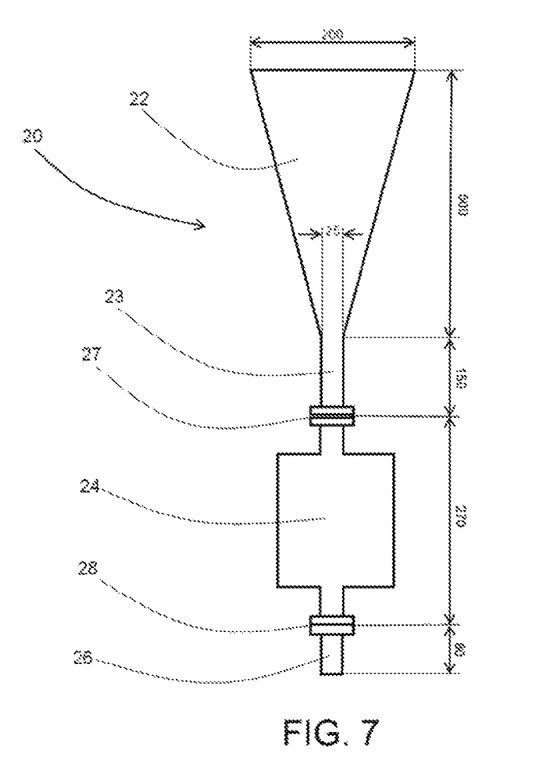
FIG. 7 shows in a schematic way, a design example of the apparatus according to the present invention.

According to the aforementioned, an example of calculation can be carried out in the following way:

An electromagnetic flow meter Siemens® TRANSMAG2 911/E of a nominal diameter of 25 mm, which satisfies the design condition 2) will be considered. This flow meter has a length of 270 mm as shown in FIG. 7.

In order to satisfy the design condition 5), the distance between the cone and the flow meter inlet, located inside the flow meter-containing chamber (24) or sealed camera is selected equal to 6 times the diameter of the pipe, that is, 6×25 mm=150 mm.

In order to satisfy the design condition 6), the distance between the flow meter outlet and the discharge is selected equal to 80 mm (3, 2 times the nominal diameter of the pipe).

The length of the sensor containing gas can be calculated from the minimum velocity condition (0.7 m/s) which is obtained when the gas volume fraction is minimum (5%). Considering an average initial discharge coefficient equal to 0.7 and isolating the total length "L" of equation 3, it is obtained: L≈1000 [mm]

Considering the dimensions already found, then the length of the upper inverted cone of the gas exclusion device results to be of 500 mm as shown in FIG. 7.

It is necessary to confirm that the design condition 4 is satisfied for the selected dimensions, that is, that the inlet fluid velocity at the upper end of the gas exclusion device is lower than 3 cm/s for the maximum value of the gas volume fraction desired to be measured (30%). The outlet value of the fluid velocity "$v_2$ in the tube (23) for the selected conditions, obtained using the equation 3 is of 1.70 m/s.

The velocity at the upper end can be calculated by means of the continuity equation, that is:

$$v_1 \cdot A_1 = v_2 \cdot A_2$$

Wherein $v_1$ y $v_2$ is the fluid velocity at the upper and lower end respectively and $A_1$ and $A_2$ is the cross section of the gas exclusion device at the upper and lower end respectively:

$$v_1 = v_2 \cdot \left(\frac{d}{D}\right)^2 < 0.03 \text{ [m/s]}$$

If the upper diameter of the gas exclusion device equal to 200 mm is selected, then it is obtained:

$$v_1 = 1,7 \cdot \left(\frac{25}{200}\right)^2 = 0.0265 < 0.03 \text{ [m/s]}$$

which satisfies the design criterion 4.

With the previously mentioned results, a design example of the exclusion device is the one shown in FIG. 7.

Advantages of the Present Invention

The present invention comprises the differentiating and advantageous characteristics with respect to the current technologies.

1. It allows an on-line and real time measurement of the gas volume fraction.
2. The gas volume fraction measurement is not affected by the presence of other disperse phases such as solid particles or liquid drops.
3. The accuracy only depends on the measurement of a variable, the pulp velocity circulating through a tube using a non-invasive technique (for example, a magnetic flow meter). Measured velocities with this kind of instrument present an error rate lower than 0.5%.
4. The measurement is precise since the error propagation when calculating the volumetric fraction is minimum when based only on one measurement.
5. Once installed in the process, the device does not require to be re-calibrated.
6. It provides a wide measurement range of the gas volume fraction in pulps, which includes the range observed in the flotation process (5% up to 30% approximately).
7. The measurement provides an average of the gas content (hold-up) in the whole volume of the flotation machine comprised between the depths defined by the upper and lower ends of the device and is not limited to the radial position in which the device is installed.

BIBLIOGRAPHICAL REFERENCES

Cortés-López, F. Design of a gas holdup sensor for flotation diagnosis. Thesis of Master of Engineering, McGill University, 1998.

Finch, J. A, & Dobby, G. S. Column Flotation. Pergamon Press, pp. 10, 1990, ISBN: 0-08-040186-4.

Finch, J. A., Xiao, J., Hardie, C., Gomez, C. O. Gas dispersion properties: bubble surface area flux and gas holdup. Minerals Engineering, Vol. 13, No. 4, pp. 365-372, 2000.

Finch, J. A., Gelinas, S., Moyo, P. A frother-related research at McGill University. Minerals Engineering, 19, pp. 726-733, 2006.

Gomez, C. O., Cortés-López, F. & Finch, J. A. Industrial testing of a gas holdup sensor for flotation systems. Minerals Engineering, Vol. 16, Issue 6, pp. 493-501, 2003.

Gorain, B. K., Franzidis, J.-P. & Manlapig, E. V. Studies on impeller type, impeller speed and air flow rate in an industrial scale flotation cell. Part 2: effect on gas holdup. Minerals Engineering, Vol. 8, No. 12, pp. 1557-1570, 1995.

Gorain, B. K., Napier-Moon, T. J., Franzidis, J.-P., Manlapig, E. V. Studies on impeller type, impeller speed and air flow rate in an industrial scale flotation cell. Part 5: Validation of k-Sb relationship and effect of froth depth. Minerals Engineering, Vol. 11, No. 7, pp. 615-626, 1998.

Harbort, G. J. & Schwarz, S. Characterization measurements in industrial flotation cells. Chapter 5 Flotation Plant Optimisation, C. J. Greet (Ed), AusIMM 2010, pp. 95-106, ISBN 978-92-522-47.

Jin, H., Han, Y., Yang, S., He, G. "Electrical resistance tomography coupled with differential pressure measurements to determine phase hold-ups in gas-liquid-solid outer loop bubble column". Flow Measurements and Instrumentation, 21, pp. 228-232, 2010.

Lopez-Saucedo, F., Uribe-Salas, A., Pérez-Garibay, R. & Magallanes-Hernandez, L. Gas dispersion in column flotation and its effect on recovery and grade, Canadian Metallurgical Quarterly, Vol. 51, No. 2, pp. 111-117, 2012.

Mott, R. L. Applied Fluid Mechanics. 6th Edition, Pearson Prentice Hall, 2006, pp. 478, ISBN: 0-13-197643-5.

Patel, A. K. & Thorat, B. Gamma ray tomography—An experimental analysis of fractional gas hold-up in bubble columns. Chemical Engineering Science, Vol. 137, Issue 2, pp. 376-385, 2008.

Sanwani, E., Zhu, Y., Franzidis, J.-P. Manlapig, E. V., & Wu, J. Comparison of gas holdup distribution in a flotation cell using capturing and conductivity techniques. Minerals Engineering, Vol. 19, Issue 13, pp. 1362-1372, 2006.

Schweitzer, J-M., Bayle, J., Gauthier, T. "Local gas hold-up measurements in fluidized bed and slurry bubble columns". Chemical Engineering Science, 56, pp. 1103-1110, 2001.

The invention claimed is:

1. A submersible system (19) for measuring a gas volume fraction in a aerated fluid inside a reactor (1) where the aerated fluid comprises a dispersed gas in the form of bubbles (3) in a fluid in a liquid form, a mixture of multiple liquids, a suspension of solids in a liquid, or a combination thereof, CHARACTERIZED in that said system comprises:
    an open and pass-through gas exclusion device (20) with a variable cross section, said open and pass-through gas exclusion device (20) defining an opening inlet and an outlet opening, whereby the fluid without gas bubbles enters the opening inlet, and exits through the outlet opening, said pass-through bubble exclusion device (20) has a diameter greater than the outlet opening wherein the outlet opening abuts with an inlet pipe (23);
    a flow meter-contain chamber (24) defining an inlet (27) and an outlet (28) and containing at least one flow meter that allows measuring velocity of the fluid without gas, when the fluid without gas is circulating between the inlet (27) and the outlet (28) of said flow meter-containing chamber (24), wherein said inlet (27) is coupled to said inlet pipe (23) and wherein said outlet (28) is coupled to an outlet pipe (26) for discharging the fluid without gas towards the reactor (1);
    a flow transmitter (29) connected to the flow meter, located inside or outside of said sealed camera (24), wherein said flow transmitter (29) generates an output signal proportional to the velocity of the fluid without gas through the gas exclusion device (20); and
    a processing unit (30) generating an output signal (31) proportional to a gas volume fraction in the aerated fluid.

2. The submersible system (19) for measuring the gas volume fraction in an aerated fluid, according to claim 1, CHARACTERIZED in that said open and pass-through gas exclusion device (20) comprises a cylindrical tube (21) of a constant straight diameter and a diameter reducing section (22) wherein the greatest diameter of the diameter reducing section (22) is equal to the diameter of the cylindrical tube (21) and the smallest diameter is equal to the diameter of the inlet pipe (23).

3. The submersible system (19) for measuring the gas volume fraction in an aerated fluid, according to claim 2, CHARACTERIZED in that said open and pass-through gas exclusion device (20) comprises only one diameter reducing section (22).

4. The submersible system (19) for measuring the gas volume fraction in an aerated fluid, according to claim 3, CHARACTERIZED in that said diameter reducing section (22) is an inverted cone.

5. The submersible system (19) for measuring the gas volume fraction in an aerated fluid according to claim 4, CHARACTERIZED in that said open and pass-through gas exclusion device (20) is vertically installed in the aerated fluid inside the reactor (1).

6. The submersible system (19) for measuring the gas volume fraction in an aerated fluid, according to claim 1, CHARACTERIZED in that said flow transmitter (29) is placed inside the reactor (1).

7. The submersible system (19) for measuring the gas volume fraction in an aerated fluid, according to claim 1, CHARACTERIZED in that said flow transmitter (29) is placed outside the reactor (1).

8. The submersible system (19)) for measuring the gas volume fraction in an aerated fluid, according to claim 1, CHARACTERIZED in that said flow meter-containing chamber (24) comprises a camera, and said flow meter and said transmitter (29) are part of a flow measurement means.

9. The submersible system (19) for measuring the gas volume fraction in an aerated fluid according to claim 1, CHARACTERIZED in that said processing unit (30) is selected from the group consisting of a computer; a programmable logic controller (PLC); a microprocessor; and a distributed control system (DCS).

* * * * *